Feb. 13, 1951        P. F. SKOOG        2,541,442
APPARATUS FOR HANDLING FISH PREPARATORY TO CANNING
Filed Oct. 20, 1948        3 Sheets-Sheet 1
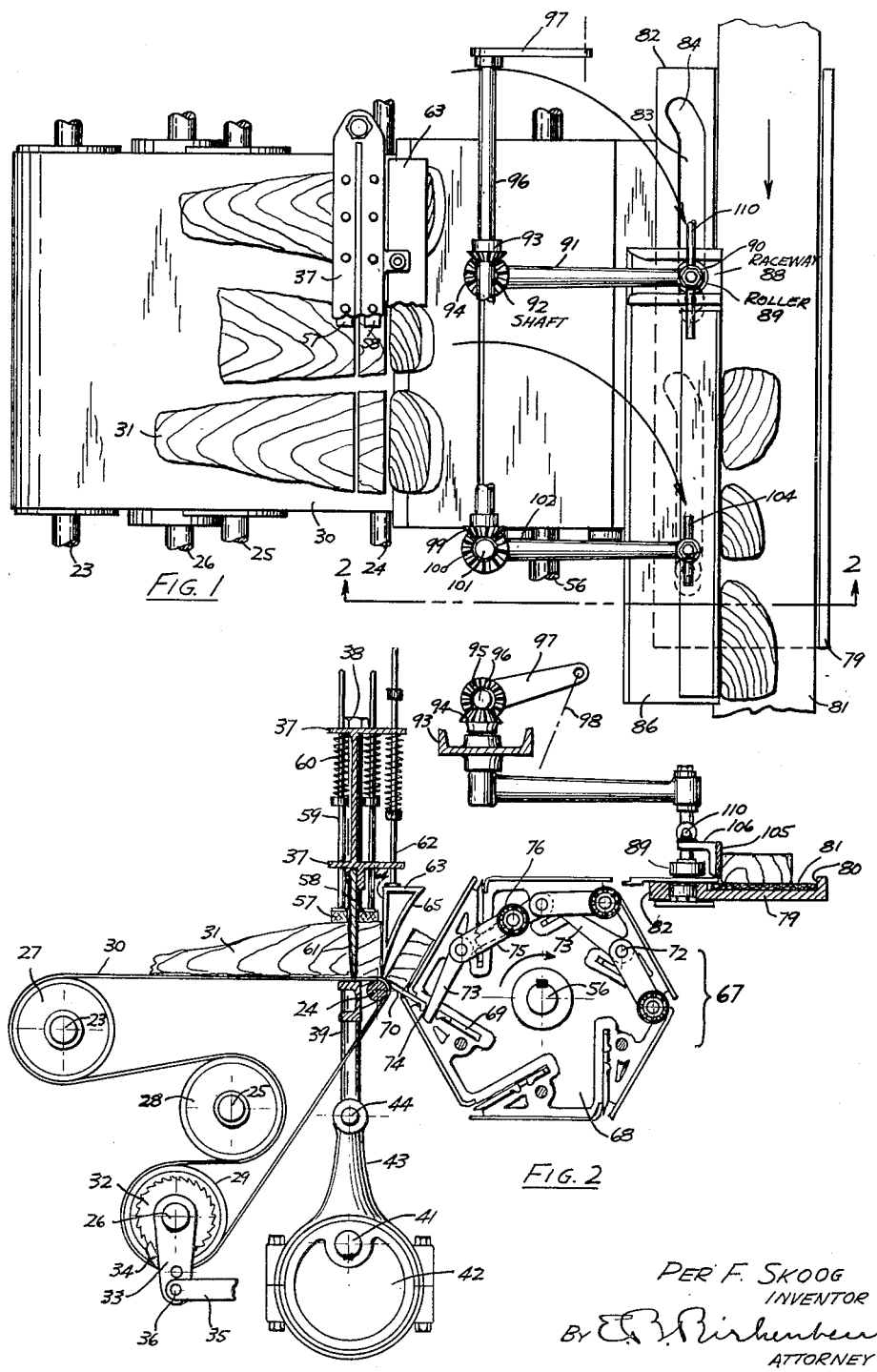
PER F. SKOOG
INVENTOR

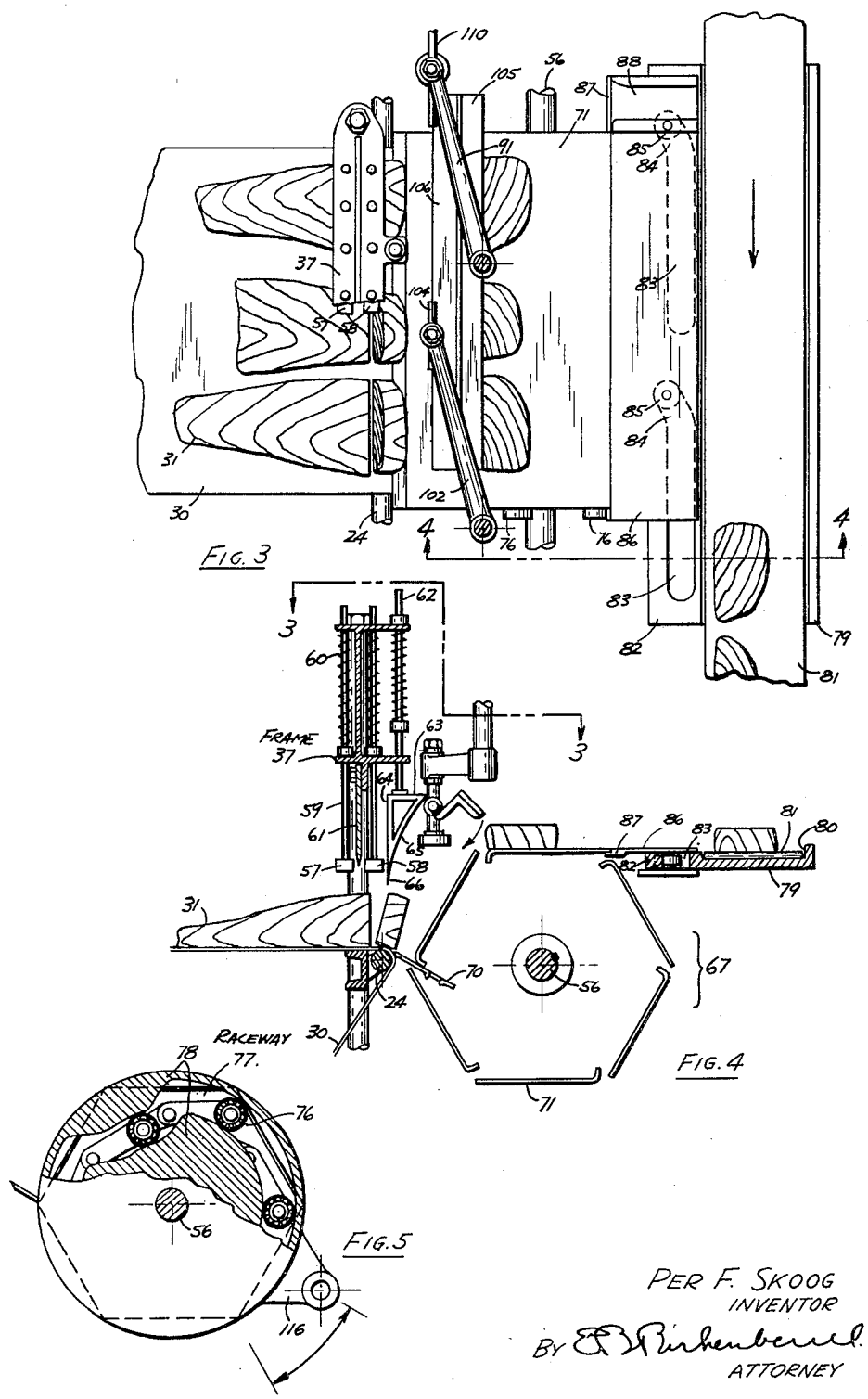

Feb. 13, 1951 P. F. SKOOG 2,541,442
APPARATUS FOR HANDLING FISH PREPARATORY TO CANNING
Filed Oct. 20, 1948 3 Sheets-Sheet 3
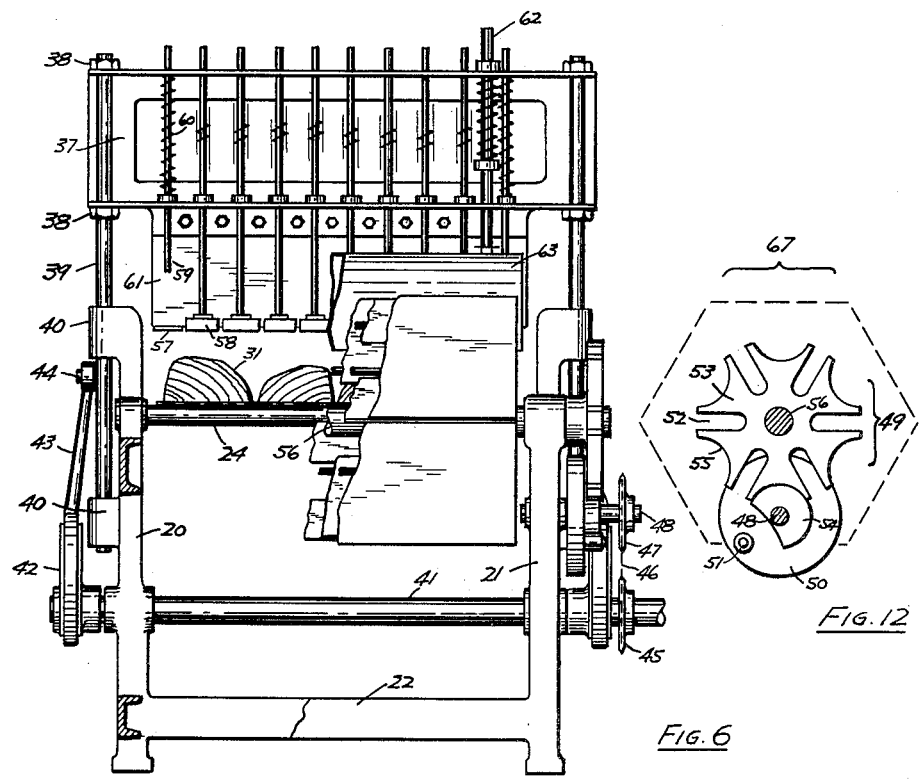
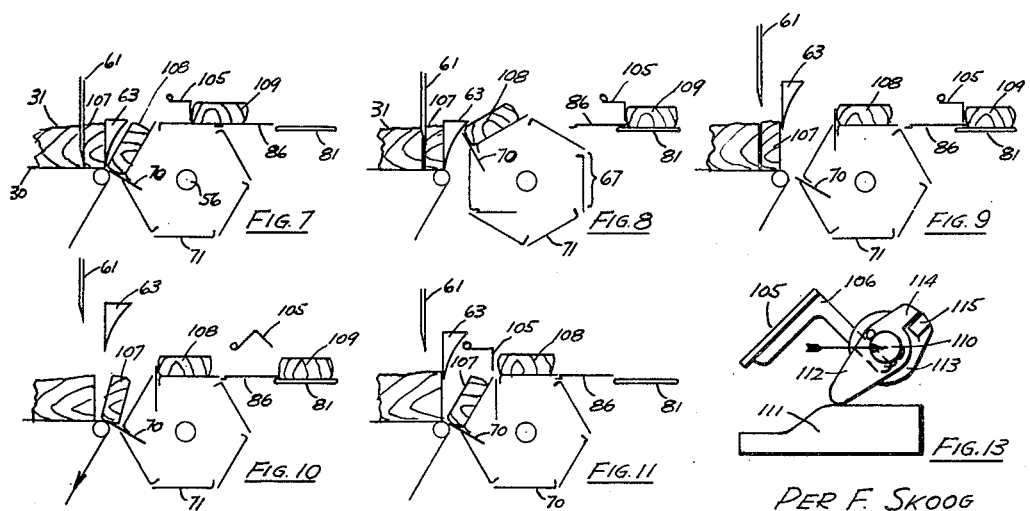
PER F. SKOOG
INVENTOR
ATTORNEY Patented Feb. 13, 1951

2,541,442

UNITED STATES PATENT OFFICE 2,541,442

APPARATUS FOR HANDLING FISH PREPARATORY TO CANNING

Per F. Skoog, Olympia, Wash.

Application October 20, 1948, Serial No. 55,494

7 Claims. (Cl. 17—4)

This invention relates generally to the commercial canning of fish and particularly to a method of and apparatus for handling fish preparatory to canning.

The main object of this invention is to provide a machine and method for cutting the fish to a length which will correspond with the depth of the can into which it is to be packed and to turn the cut pieces up on end and to transfer them to a continuously moving conveyor by means of which they are carried to a can filling machine described in my U. S. Patent 2,248,311.

The second object is to provide a machine which will handle the pre-cooked fish without an objectionable amount of breakage.

The third object is to make it possible to attain the high speed property of a machine with the delicate action of the human hand.

The fourth object is to reduce the amount of labor required in the canning operation and, at the same time, reduce the amount of breakage which, in hand packing, commonly amounts to twenty per cent of the pack to less than five per cent when my machine and method are employed.

The fifth object is to improve the pack from a sanitary standpoint as it eliminates entirely all contact with the hands.

The sixth object is to improve the pack by reducing the length of time required for processing, making it possible to place the fish within the cans as soon as possible, thereby reducing oxidation as well as shortening the period of exposure to contamination by gas and odors or dust and lint which may be carried by the air.

These and other objects are accomplished in the manner set forth in the following specification as illustrated in the accompanying drawings, in which:

Fig. 1 is a fragmentary plan of the machine showing a slicing operation.

Fig. 2 is a section taken along the line 2—2 in Fig. 1.

Fig. 3 is a horizontal section taken along the line 3—3 in Fig. 4, but omitting the separator 63, showing the cut slices turned over on the table.

Fig. 4 is a section taken along the line 4—4 in Fig. 3.

Fig. 5 is a side elevation of the cam element with a portion broken away in section.

Fig. 6 is an end elevation of the machine with parts broken away in section to disclose hidden parts.

Fig. 7 is a diagrammatic view showing a slicing cut.

Fig. 8 is a view similar to Fig. 7, showing the cut slices being picked up.

Fig. 9 is similar to Fig. 8, showing the slices elevated to the plane of the off-bearing conveyor.

Fig. 10 is a view similar to Fig. 9 showing the slice moved onto the conveyor by the pusher with the pusher withdrawn.

Fig. 11 is a view similar to Fig. 10, showing the parts in position for the start of the next slice.

Fig. 12 is a side elevation of the Geneva motion for operating the turret in which the motion shafts are shown in cross section.

Fig. 13 is a side elevation of the rake tipping cam in a position corresponding with Fig. 10.

Like numbers of reference refer to the same or similar parts throughout the several views.

There is shown only sufficient structure to give a clear understanding of its operation.

Referring in detail to my invention, there is shown a pair of side frames 20 and 21 which are joined by the cross ties 22.

Journalling in the frames 20 and 21 are the shafts 23, 24, 25 and 26. On the shafts 23, 25 and 26 are mounted the pulleys 27, 28 and 29, around which pulleys 27, 28 and 29 and shaft 24 passes a conveyor belt or apron 30 upon which the partially processed fish loins 31 are placed parallel to the length of the apron 30.

Motion is imparted to the pulley 29 through a ratchet wheel 32 which is secured to the pulley 29. On the shaft 26 is rockably mounted an arm 33 provided with a pawl 34 which engages the teeth of the ratchet wheel 32. A link 35 is attached to the arm 33 by means of a pin 36 and receives a reciprocating motion from a source (not shown). The simple object of this mechanism is to impart an intermittent movement to the conveyor belt or apron 30.

Above the apron 30 is mounted a vertically movable frame 37 which is secured by the nuts 38 to the slide rods 39 mounted in the vertical guides 40.

Across the frames 20 and 21 is mounted the eccentric shaft 41 near the opposite ends of which are mounted the eccentrics 42 whose rods 43 are attached to the slide rods 39 by means of the pins 44.

On the shaft 41 is secured a sprocket wheel 45 whose chain 46 drives a sprocket wheel 47 on the shaft 48 of a Geneva wheel 49 whose disc 50 is provided with a roller 51 which engages the slots 52 in a driver disc 53 when driving and the locking disc 54 engages the arcuate portion 55 for the purpose of holding the disc 53 between driving operations in a manner which is well understood.

The disc 53 is secured on the shaft 56 which is supported by the frames 20 and 21.

On the frame 37 are mounted a plurality of presser feet 57 and 58 which are arranged in two rows transversely with relation to the apron 30. The feet 57 and 58 are mounted on the vertical rods 59 which are slidable in the frame 37 and urged downwardly by the springs 60.

The feet 57 and 58 engage the loins 31 whenever the frame 37 is moved downwardly by the eccentric 42, and the area of the feet 57 and 58 and the pressure of the springs 60 should be such as to hold the loins without injuring or crushing them.

Secured to the frame 37, between the feet 57 and 58, is a slicing knife 61 which, on its lowermost travel, comes to the apron 30 but not near enough to cut the apron.

Also mounted on the frame 37 are a pair of vertical spring urged rods 62, on the lower ends of which is mounted a separator blade 63 whose side 64 adjacent the knife 61 is vertical and whose opposite side 65 is arcuate. The lowermost edge 66 is thin but not sharp, as the function of the blade 63 is to separate the pieces and provide a wall preventing the pieces from tipping when they are picked up by the turning device as well as to support the slice while being severed from the loin 31.

The turning turret 67 consists of a pair of end frames 68 which are keyed on the shaft 56 which is rotated by the driver disc 53 of the Geneva wheel 49.

The frames 68 have formed therein slots 69 in which are slidably placed the shelves 70 which are normal to the flat sides 71 of the turret 67 in front of and adjacent to the shelves 70. The shelves 70 may be retracted within the turret 67 or extend therefrom at the lines of intersection of each pair of sides 71.

Within the turret 67 and mounted on the end frames 68 are the pivots 72, on both ends of which are secured levers 73 which extend through openings 74 formed within each shelf 70.

A second lever 75 is attached to one end of the pivot 72 and carries thereon an anti-friction roller 76 disposed within the raceway 77 of a rockable cam 78 which is also mounted on the axis of the turret shaft 56 and is rocked by means of the attached arm 116 and a link connecting same to a suitable cam (not shown) on shaft 41. This cam 78 is made rockable rather than stationary so that the shelves 70 can be projected outwardly to rest on the upperside of shaft 24 after the turret 67 has come to rest.

It will be noted that the anti-friction rollers 76 project beyond the ends of the flat sides 71 of the turret 67 and occupy positions in the raceway 77 of rockable cam 78 and the position of the rollers 76 is such as to cause the rollers 76 to move the shelf 70 inwardly and outwardly throughout the various positions shown in Figs. 7 to 11 inclusive.

Alongside of the turret 67 and parallel with the top thereof is a table 79 having formed therein a channel 80 in which rides the top run of a conveyor belt 81.

The portion 82 of the table 79 has formed therein the two straight slots 83 which terminate at one pair of ends in the curved slots 84 in each of which is a roller 85.

The rollers 85 are mounted on the under side of a transfer plate 86 whose edge 87 is grooved to receive one edge of the nearest flat side 71 of the turret 67.

Above the plate 86 is formed a raceway 88 which contains the roller 89 which in turn is mounted on the upright spindle 90 which is carried by an arm 91 on the upright shaft 92 which journals in the channel shaped bracket 93 and has on its upper end a bevel gear 94 which meshes with a bevel gear 95 on the horizontal shaft 96. A rock lever 97 is secured on the shaft 96 and a rocking motion is imparted thereto from a cam (not shown) on shaft 41 by a link 98.

On the shaft 96 is also a gear 99 which drives a gear 100 on the vertical shaft 101 to which is secured an arm 102 equal in length to the arm 91 and operating in conjunction therewith. The arm 102 has a vertical spindle 103 on its outer end which together with the spindle 90 have hinge fastenings 104 and 110 to the transfer bar or rake 105 provided with angular connectors 106 to the hinges 104.

It will be understood that, up to the present time, whole fish or loins from fish like tuna has been fed through a gang knife or cutting machine, after which operation the arrangement of the cut pieces to feed a given filling machine has been done by hand.

As my machine is primarily designed for handling pre-cooked fish like tuna it may, with minor adjustments, be used to cut any kind of fish or similar products. In order to obtain a high capacity without submitting the cut pieces to severe abuse which would cause an objectionable amount of breaking up of the pieces, this machine has been designed in a manner above described.

It will be noted that the force applied which will cause the movement of the products is always applied to the same side or surface throughout the operation. The advantage arising from the use of my machine and method lies in the fact that the whole fish or loin is placed upon the feeding apron, after which the operation becomes fully automatic. Inasmuch as the pieces are cut, separated and turned up in order to enter the cans in the proper way and the pieces are transferred onto the conveyor belts at the same speed that the belt is travelling, it can be seen that the pieces are not subjected to any breaking up or deteriorating action.

The operation of the machine is as follows: Assuming that fish loins 31 are resting on the apron 30, by means of which they are conveyed to the slicing knife 61, it follows that when the knife 61 descends, together with the separator blade 63, a piece of fish 107 will be cut off, being supported on the one side by the knife 61 and the other side by the separator blade 63. It will be noted that in this descent of the blade 63, it has pushed the previously cut piece 108 onto the shelf 70 as shown in Fig. 7.

As the movement continues, the knife 61 arises as shown in Fig. 8 and the turret 67 rotates, carrying the piece 108 upwardly while the separator blade 63 remains in a depressed or guiding position. In Fig. 9, the knife 61 and blade 63 are still further elevated and the piece 108 has reached a horizontal position on the top of the turret 67. By this time, the transfer plate 86 is moved up to the turret 67 ready to receive the piece 108 when pushed out by means of the bar 105 which carries the piece 108 onto the conveyor belt 81.

In Fig. 10 this cycle is continued and the previously cut piece 107 is falling into position on the side of the turret 67. Here it will be noted that the bar 105 is raised above the plane of the piece and is ready to be returned to its original position by means of the action of the arms 91 and 102.

It will be noted that in Fig. 7, the piece 109 is being pushed off of the turret by the bar 105 while in Figs. 8 and 9 it is on the belt 81, while in Fig. 10 the bar 105 is raised for its return trip and in Fig. 11 it has been lowered.

In Fig. 13, rake 105, angular connectors 106, shaft 110 and driver plate 113 are tilted on the return stroke by the interaction of stationary cam 111 and cam follower arm 112, which is free to rotate on shaft 110 and drives plate 113 through lugs 114 and 115.

From the foregoing, it can be seen that the cycle is continuous and complete and since the time element is an important factor in canning operations, both in regard to the labor cost and product deterioration, the advantage arising therefrom is apparent and the sanitary condition of the pack has been greatly improved.

As previously stated, only such portions of the mechanism necessary to an understanding of the apparatus and method have been illustrated and any mechanical equivalents of those shown may be employed without departing from the spirit of this invention.

I claim:

1. A machine for preparing fish for canning, consisting of an apron for conveying fish loins, a knife disposed above said apron for slicing said loins, spring urged presser feet on each side of said knife, a spring urged separating blade spaced from said knife, a turret disposed in front of the discharge end of said apron having a plurality of flat faces formed thereon, means operatively connected to said turret for intermittently turning said turret and stopping it when one of its flat faces is adjacent to and spaced from said separator, an off-bearing conveyor disposed along the top of said turret and a rake operatively associated with said turret for transferring slices of the fish to said off-bearing conveyor.

2. A machine of the class described, having in combination an apron for conveying fish loins, a double row of presser feet yieldably mounted over said apron, a slicing blade disposed between said rows of presser feet, a separator yieldably mounted in parallelism to said slicing blade, a turning turret mounted in front of the discharge end of said apron, said turning turret having six flat sides, a Geneva wheel for positioning said turret in which the top of said turret will assume a parallel position with relation to said apron, a separating blade spaced from said slicing blade having an inclined surface facing said turning turret, means operatively connected to said turret for rotating said turret through one of its divisions and means operatively associated with said turret for removing pieces of sliced fish from the top side of said turret.

3. A device of the class described having in combination a loin conveying apron, two spaced rows of presser feet yieldably mounted transversely across said apron, a slicing knife operable between said presser feet, a separator blade yieldably operable in parallelism with said slicing knife and spaced therefrom by one row of presser feet, a hexagonal turret mounted on a horizontal axis in front of the discharge of said apron, said turret having shelves outwardly slidable through the vertices of the turret, a cam for operating said shelves, an off-bearing conveyor having a horizontal run below the top side of said turret, a transfer plate between said off-bearing conveyor and the top side of said turret, a cam associated with said transfer plate for moving said transfer plate toward said turret for the purpose of forming a continuous surface in relation thereto, and a rake operatively associated with said turret for moving pieces of fish loin from the top horizontal side of said turret across said transfer plate onto said off-bearing conveyor.

4. A machine of the class described consisting of an apron for moving fish loins in a horizontal plane, a slicing knife mounted over said apron, a hexagonal turret mounted in front of the discharge end of said apron on a horizontal axis approximately on the level of said apron, said turret having means for stopping same intermittently with its flat side uppermost and with an inclined side facing said apron, said turret having mounted therein slidable shelves, each of which is normal to a turret side, a separator blade spaced from said slicing knife and a rake having means for moving same horizontally along the top of said turret to push pieces therefrom and a cam associated with said rake for raising said rake above said pieces on the return movement thereof.

5. In a machine of the class described, the combination of a hexagonal turret having a horizontal axis, a loin conveying apron having a horizontal top run approximately on the plane of said turret axis, a slicing knife mounted over said apron, presser feet on each side of said knife, a separator blade spaced from said slicing knife by a row of presser feet, said separator blade having a curved side facing an adjacent inclined side of said turret, a shelf slidably mounted in said turret and projectable therefrom on the trailing edge of said inclined side normal thereto, a conveyor belt disposed alongside of said turret having its top run slightly below the top side of said turret, a transfer plate slidable horizontally between said conveyor belt and the top side of said turret, an actuator operatively associated with said transfer plate for sliding said transfer plate, a rake mounted over said turret and transfer plate having actuating arms therefor and having a tilting cam whereby said rake assumes a vertical position when moving away from said turret and an outwardly tilted position when moving toward said turret.

6. A machine for preparing fish for canning consisting of an apron for conveying fish loins, a knife disposed above said apron for slicing said loins, a spring urged separating blade spaced from said knife, an off-bearing conveyor associated with said separator blade, and a turret for carrying separated pieces of fish from said separating blade and depositing same on said conveyor.

7. A machine for preparing fish for canning consisting of an apron for conveying fish loins longitudinally, a cut-off knife disposed above said apron for slicing said loins transversely with said apron, a separating blade at the discharge end of said apron spaced from said cut-off knife, a turret upon which said separating blade can deposit a slice of fish after it is severed by said cutting knife, means for turning said turret so that the deposited slice of fish will lie on the top side thereof, an off-bearing conveyor associated with said turret and occupying a plane below the top side of the turret, and a rake for transferring a slice of fish from said turret to said off-bearing conveyor.

PER F. SKOOG.

REFERENCES CITED

The following references are of record in the file of this patent:

UNITED STATES PATENTS

| Number | Name | Date |
| --- | --- | --- |
| 346,871 | Shute et al. | Aug. 3, 1886 |
| 743,742 | Munn | Nov. 10, 1903 |
| 1,655,581 | Sullivan | Jan. 10, 1928 |
| 1,905,338 | Brierly | Apr. 25, 1933 |
| 2,041,986 | Wetmore | May 26, 1936 |
| 2,044,813 | Rooney | June 23, 1936 |
| 2,226,019 | Rooney | Dec. 24, 1940 |